US009418657B2

(12) United States Patent
Daniels

(10) Patent No.: US 9,418,657 B2
(45) Date of Patent: Aug. 16, 2016

(54) COMMUNICATION SYSTEM AND METHOD FOR AN EAR WORN COMMUNICATION DEVICE

(71) Applicant: Shavar Daniels, Bronx, NY (US)

(72) Inventor: Shavar Daniels, Bronx, NY (US)

(73) Assignee: Shavar Daniels, Bronx, NY (US)

( * ) Notice: Subject to any disclaimer, the term of this patent is extended or adjusted under 35 U.S.C. 154(b) by 0 days.

(21) Appl. No.: 14/882,266

(22) Filed: Oct. 13, 2015

(65) Prior Publication Data

US 2016/0037251 A1 Feb. 4, 2016

Related U.S. Application Data

(63) Continuation-in-part of application No. 13/905,566, filed on May 30, 2013, now abandoned.

(51) Int. Cl.
*H04M 1/00* (2006.01)
*G10L 15/22* (2006.01)
*H04R 1/10* (2006.01)

(52) U.S. Cl.
CPC .............. *G10L 15/22* (2013.01); *H04R 1/1008* (2013.01); *H04R 1/1041* (2013.01); *G10L 2015/223* (2013.01); *H04R 2420/07* (2013.01); *H04R 2420/09* (2013.01); *H04R 2430/01* (2013.01)

(58) Field of Classification Search
CPC .............................................. H04N 2005/4432
USPC ............ 455/41.2, 575.8, 550.1, 575.1, 575.2, 455/563, 566, 569.1; 379/430.1, 420.04, 379/420.03, 428.01
See application file for complete search history.

(56) References Cited

U.S. PATENT DOCUMENTS

| 8,401,860 | B1 * | 3/2013 | Evans | G10L 15/22 340/945 |
|---|---|---|---|---|
| 8,902,315 | B2 * | 12/2014 | Fisher | H04M 1/6066 348/164 |
| 9,101,279 | B2 * | 8/2015 | Ritchey | G03B 37/00 |
| 2012/0287284 | A1 * | 11/2012 | Jacobsen | G06F 1/163 348/158 |
| 2015/0085184 | A1 * | 3/2015 | Vidal | H04N 5/2252 348/376 |

* cited by examiner

*Primary Examiner* — Nay A Maung
*Assistant Examiner* — Angelica M Perez

(57) ABSTRACT

A communication system and method provides a communication device that fits on the ear and responds to audible commands. The communication system is sufficiently independent to initiate and receive communications without requiring a mobile phone, since contact information is stored in the communication device. The communication device is configured with a motion sensor, and a remote control module to control a car or computer. The communication system performs functions, optionally, with an audible command, such as, initiating communication, accessing content, accessing tools, making payments.

4 Claims, 15 Drawing Sheets

COMMUNICATION SYSTEM AND METHOD FOR AN EAR WORN COMMUNICATION DEVICE

CROSS-REFERENCE TO RELATED APPLICATIONS

The present continuation patent application claims priority benefit of the U.S. nonprovisional patent application Ser. No. 13/905,566 filed 30 May 2013 entitled "COMMUNICATION SYSTEM AND METHOD" under 35 U.S.C. 120, and further claims priority to U.S. provisional application patent Ser. No. 61/673,271 filed 19 Jul. 2012 under 35 U.S.C. 119 (e). The contents of these related patent applications are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to wearable communication devices and methods. More particularly, the invention relates to wearable communication systems with voice activated operation.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Generally, consumer electronics technology is becoming smaller and more portable. A user typically carries an electronic device such as a smart phone in their pocket and operates the electronic device with their hands. Sometimes it may be useful to operate an electronics device without the use of hands as it may allow for a user's hands to be free for other tasks. Wearable electronic devices may allow a user to perform other tasks while still allowing a user to operate the wearable electronic device.

The following is an example of a specific aspect in the prior art that, while expected to be helpful to further educate the reader as to additional aspects of the prior art, is not to be construed as limited the present invention, or any embodiments thereof, to anything stated or implied therein or inferred thereupon. By way of educational background, another aspect of the prior art generally useful to be aware of is that peripheral devices such as Bluetooth earpieces may connect to an electronic device, such as a smart phone, and operate the electronic device in a limited manner and/or with reduced functionality.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
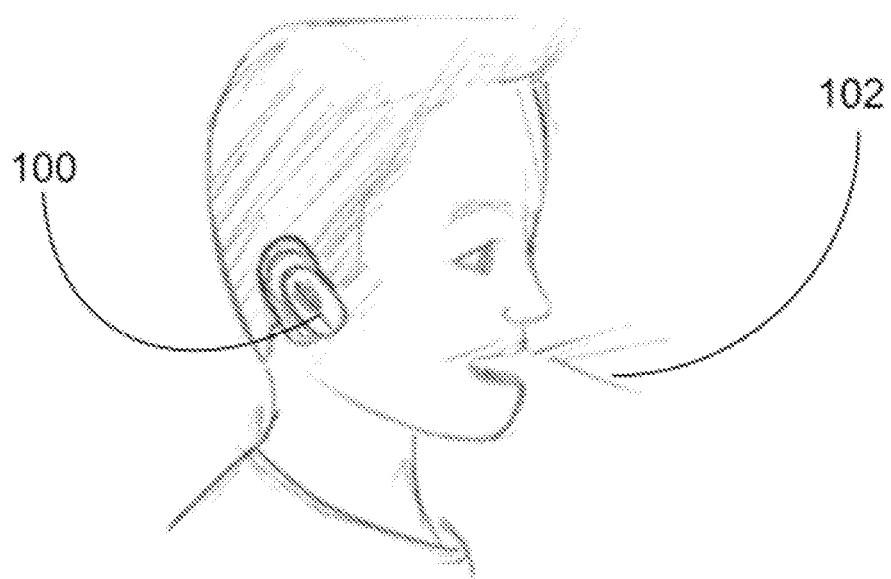
FIG. 1 illustrates a detailed perspective of an exemplary communication system responding to an audible command, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. §112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

TERMINOLOGY

The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter. Moreover, for any claim of the present invention which claims an embodiment "consisting essentially of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™., C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3 G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM®. MQSeries®. technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

The present invention will now be described in detail with reference to embodiments thereof as illustrated in the accompanying drawings.

There are various types of communication systems and methods that may be provided by preferred embodiments of the present invention. In one embodiment of the present invention, the communication system and method may provide a communication device configured to be operable to join with an ear and operable to respond to audible commands. The communication system may be sufficiently independent to initiate and receive communications without requiring a second communication device, since contact information is stored in the communication device. In one embodiment, the communication device may emit and receive short-wavelength radio transmissions and create a local network in proximity to the system. In some embodiments, the communication device may be configured to receive a data cord for exchanging data with a processor. The data may include, without limitation, contacts, files, positioning information, books, music, and radio entertainment. The data may be accessed, actuated, and transmitted with an audible command. In some embodiments, the communication system may perform at least one function with an audible command, including, without limitation, initiating communication by speaking a contact name and/or number, accessing an encyclopedia, accessing an dictionary, accessing an internet, saving and filing text notes on a processor, accessing a global positioning system, accessing a calculator, and accessing a AM/FM radio, internet radio, satellite radio, downloads music from the internet, has a music sharing feature, is a audible remote control, transfers spoken conversations to devices screens, has a touch screen to control functions, it vibrates when calls come in, has a language changer feature, has a voice ID banking system, has 8 gb-128 gb of storage, has a credit card bill payment system, interprets emails and text in every language to and from, downloads books, music, apps, remotely controls cars operations, has an answering machine, has a clock, it dictates messages to other devices, has a translator, has a waterproof camera, has a projector, has a scanner, has a motion sensor, remotely controls computer devices, transfers information to other devices with a USB or flash drive, syncs with Bluetooth stereo speakers, has a PDA system, has a wireless payment system, has a voice recognition system to turn device off & on, can download operational systems, connects to Wi-Fi calling Wi-Fi internet, has mobile hotspot connectivity, can check heart rate, pulse, and temperature In one embodiment of the present invention, the communication system may include a communication device configured to be operable to join with an ear and operable to respond to audible commands. The communication device may include, without limitation, a wireless phone that is worn on either left or right ear. The device may be operable to initiate communication with an audible command. The communication device may be moisture resistant and thereby operable outdoors while being worn on the ear. In some embodiments, the communication device may include a power switch for powering on and off the device. In some embodiments, the communication device may include a mounting portion for securing the communication device to the ear. The mounting portion may include a hook shape configured to at least partially wrap around the ear. In some embodiments, the communication device may include a microphone for receiving an audible command. The microphone may be operatively joined with a communication processor that positions inside the communication device. In some embodiments, a speaker portion may transmit communications form a different communication device.

In one embodiment of the present invention, the communication device may include a data port for receiving a data cord. The data cord may be configured to transmit data between the communication device and a processor. In some embodiments, the communication device may include a power port for receiving a power cord. The power cord may join with a power source for providing power to the communication device. In some embodiments, a display portion may provide a display of contacts, allow for initiating and receiving of communications. The display portion may include, without limitation, a touch screen.

FIG. 1 illustrates a detailed perspective of an exemplary communication system responding to an audible command, in accordance with an embodiment of the present invention. In the present embodiment, a communication system and method may include a communication device 100 configured to be operable to join with an ear and operable to respond to an audible command 102. The communication system may be sufficiently independent to initiate and receive communications without requiring a second communication device, since contact information is stored in the communication device. In one embodiment, the communication device may emit and receive short-wavelength radio transmissions and create a local network in proximity to the system. In some embodiments, the communication device may be configured to receive a data cord for exchanging data with a processor. The data may include, without limitation, contacts, files, positioning information, books, music, and radio entertainment. The data may be accessed, actuated, and transmitted with an audible command. In some embodiments, the communication system may perform various functions with an audible command, including, without limitation, initiating communication by speaking a contact name and/or number, accessing an encyclopedia, accessing an encyclopedia, accessing an internet, saving and filing text notes on a processor, accessing a positioning system, accessing a calculator, and accessing a radio.

In one embodiment of the present invention, the communication system may include a communication device configured to be operable to join with an ear and operable to respond to audible commands. The communication device may include, without limitation, a wireless phone that is worn on either left or right ear. The device may be operable to initiate communication with an audible command. The communication device may be moisture resistant and thereby operable outdoors while being worn on the ear.

Figure 2:
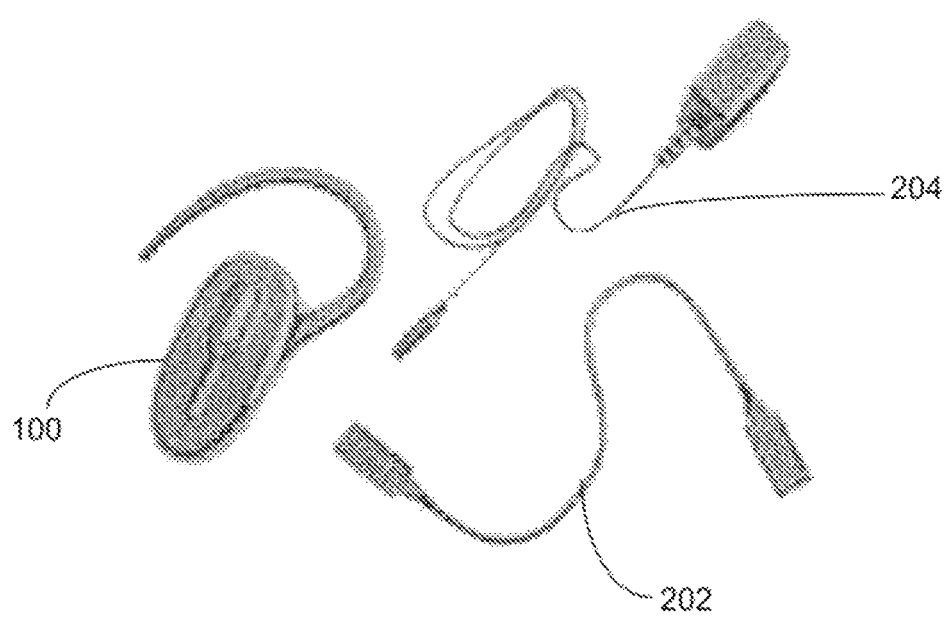
FIG. 2 illustrates a top view of an exemplary communication device, an exemplary data cord, and an exemplary power cord, in accordance with an embodiment of the present invention.

FIG. 2 illustrates a top view of an exemplary communication device, an exemplary data cord, and an exemplary power cord, in accordance with an embodiment of the present invention. In the present embodiment, the communication device may include a data port for receiving a data cord 202. The data cord may include, without limitation, a USB cord, an Ethernet cable, a data cable, and a fiber optic cable. The data cord may be configured to transmit data between the communication device and a processor. The data may include a contact for communicating with. In this manner, the contact may be accessed from a database in the processor. However, in another embodiment, the communication device may exchange data with the processor remotely. In some embodiments, the communication device may include a power port for receiving a power cord 204. The power cord may join with a power source for providing power to the communication device. However, in another embodiment, the communication device may include a portable power source, including, without limitation, a battery, a solar cell, and a lithium polymer battery molded into the shape of an ear piece for efficient use of space and battery power.

Figure 3A:
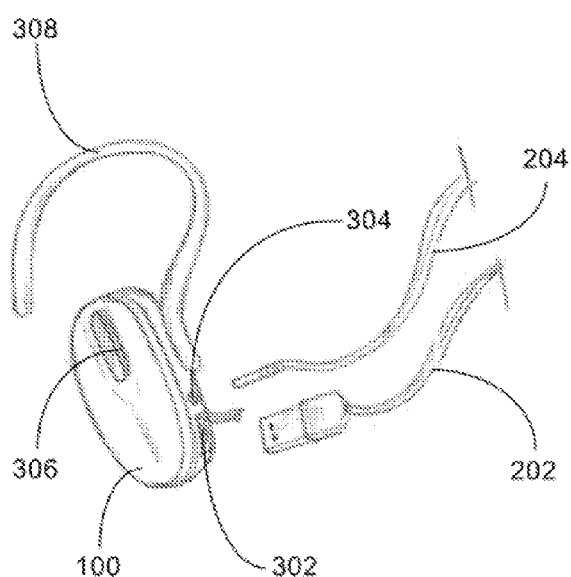
FIGS. 3A and 3B illustrate top views of exemplary communication devices, in accordance with an embodiment of the present invention.
Figure 3B:
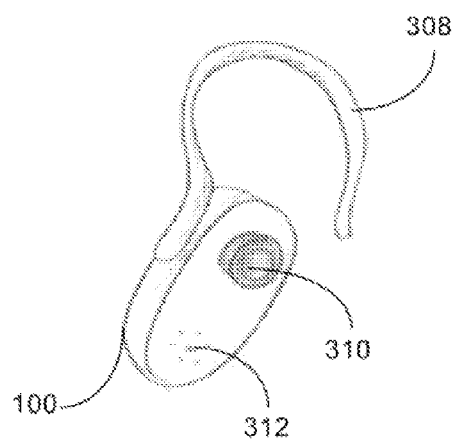

FIGS. 3A and 3B illustrate top views of exemplary communication devices, in accordance with an embodiment of the present invention. In the present embodiment, a data port 302 may position on the communication device for receiving the data cord. The data port may include, without limitation, a serial port, a terminal, a pin, and a pinout. In some embodiments, a power port 304 may receive the power cord from an external power source. In some embodiments, the communication device may include a power switch 306 for powering on and off the device. In some embodiments, the communication device may include a mounting portion 308 for securing the communication device to the ear. The mounting portion may include a hook shape configured to at least partially wrap around the ear. However, in other embodiments, the mounting portion may join the ear with other mechanisms, including, without limitation, an adhesive, a clip, a string, a hoop that completely wraps around the ear. However, in other embodiments, the communication device may wedge inside the ear, without requiring a mounting portion. In some embodiments, the communication device may include a microphone 312 for receiving an audible command. The microphone may be operatively joined with a communication processor that positions inside the communication device. In some embodiments, a speaker portion 310 may transmit communications received form a different communication device. The speaker portion may include an adjustable volume operable with an audible command.

Figure 4:
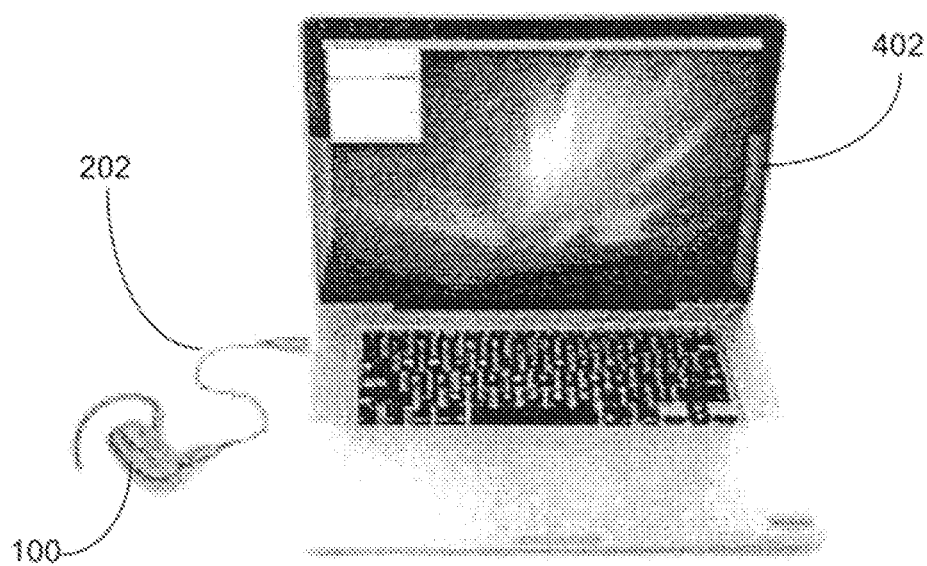
FIG. 4 illustrates a detailed perspective view of an exemplary communication device joined to an exemplary with an exemplary data cord, in accordance with an embodiment of the present invention.

FIG. 4 illustrates a detailed perspective view of an exemplary communication device joined to an exemplary with an exemplary data cord, in accordance with an embodiment of the present invention. In the present embodiment, the communication device may include a data port for receiving a data cord. The data cord may be configured to transmit data between the communication device and a processor 402. The processor may include, without limitation, a computer, a database, a server, and an integrated circuit. In some embodiments, the communication device may include a power port for receiving a power cord. The power cord may join with a power source for providing power to the communication device. In some embodiments, a display portion may provide a display of contacts, allow for initiating and receiving of communications. The display portion may include, without limitation, a touch screen.

Figure 5:
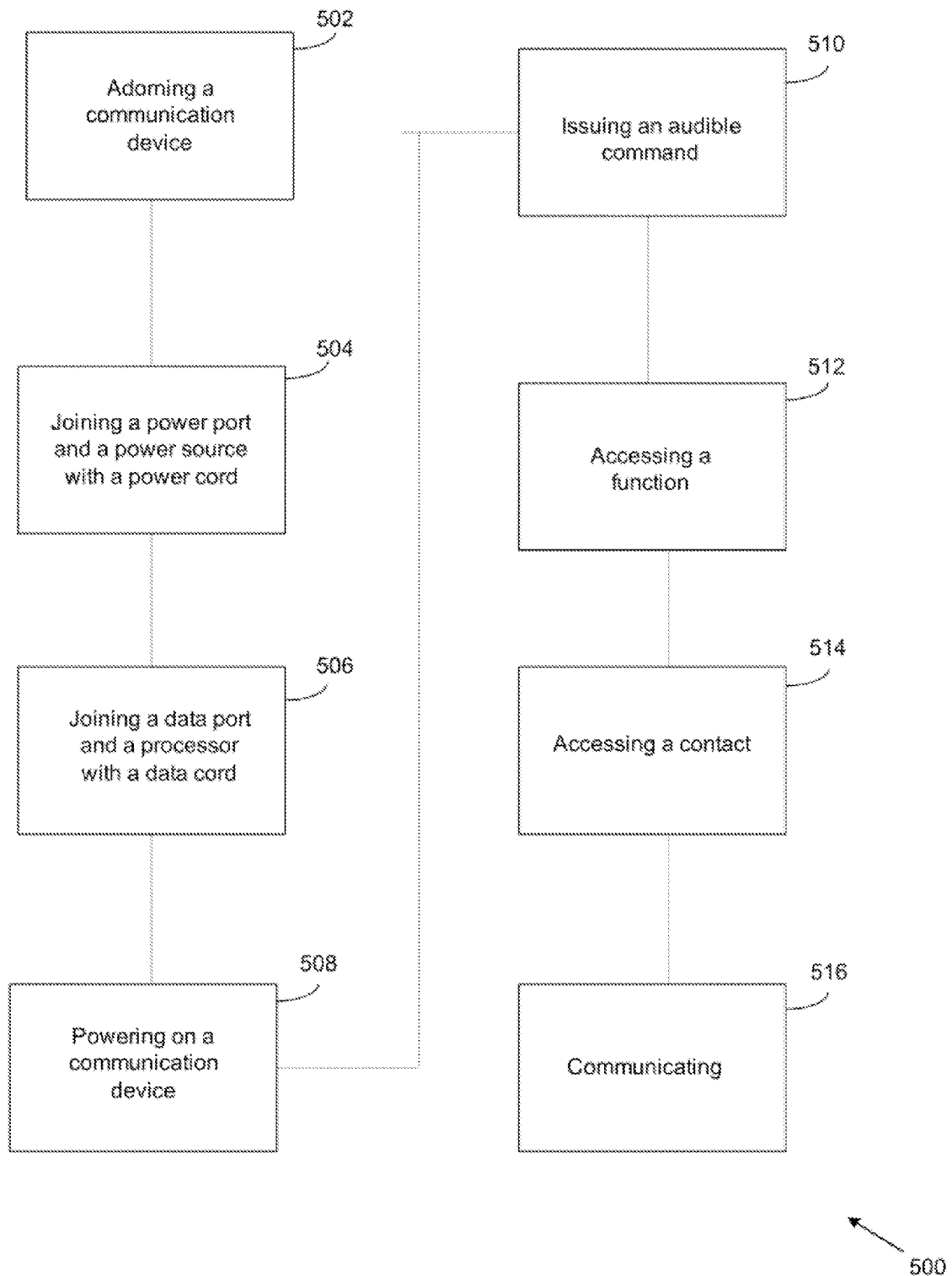
FIG. 5 illustrates a flowchart diagram of an exemplary communication method, in accordance with an embodiment of the present invention.

FIG. 5 illustrates a flowchart diagram of an exemplary communication method, in accordance with an embodiment of the present invention. In the present embodiment, a communication method 500 allows a user to initiate communications and access a plurality of functions with an audible command. A communication device is operable to access a contact and initiate communication with the contact upon an audible command. For example, without limitation, saying "Call Joe Davis" while wearing the communication device on the ear prompts the communication device to dial a specific phone number. The communication method also converts audible commands into functions, such as locating a spot with a positioning system, and accessing and using a dictionary. The communication method may utilize numerous steps to achieve the desired communication. A first Step 502 may include adorning a communication device. The communication device may include an ear piece with a mounting portion. The mounting portion may be configured to at least partially wrap around an ear. The communication device may be oriented so that an earpiece and a speaker face inwardly, towards an ear and a mouth. In this manner, audio signals from the communication are in proximity to the ear and mouth. A Step 504 may include joining a data port in the communication device to a processor with a data cord. The data cord may include, without limitation, a USB cable. However, in other embodiments, the data port may communicate with the processor wirelessly. The processor may include, without limitation, a computer, remote data storage, a server, and a network. In this manner, data, such as contact information may be shared between the communication device and the processor. A Step 506 may include joining a power port in the communication device to a power source with a power cord. However, in other embodiments, the communication device may include an internal power source.

In one embodiment of the present invention, a Step 508 may include powering on the communication device. A power switch and/or a touch screen may function to power on and power off the communication device. A Step 510 may include issuing an audible command to perform at least one function, including, without limitation, accessing a contact, initiating a communication, receiving a communication, accessing a positioning system, accessing an encyclopedia, and accessing a calculator. Those skilled in the art, in light of the present invention, will recognize that voice recognition software may be utilized to not only comprehend the audible command, but also to identify the speaker. A Step 512 may include accessing at least one function based on the audible command. The at least one function may include, without limitation, initiating communication by speaking a contact name and/or number, accessing an encyclopedia, accessing an encyclopedia, accessing an internet, saving and filing text notes on a processor, accessing a positioning system, accessing a calculator, and accessing a radio. A Step 514 may include accessing a contact for initiating a communication by giving an audible command. The contact may be stored on the processor, or on the communication device. A Step 516 may include communicating with the communication device. The communication system may be sufficiently independent to initiate and receive communications without requiring a second communication device, since contact information is stored in the communication device.

In one alternative embodiment, the communication device may include a scaled down cell phone implementation without power intensive multi-band capabilities, or processor intensive multi-media and internet. In yet another embodiment, the at least one function performed by the audible command can perform functions remotely, such as opening a garage door or powering off an electrical device. In yet another alternative embodiment, the contacts are received wirelessly rather than with a data cord.

Figure 6:
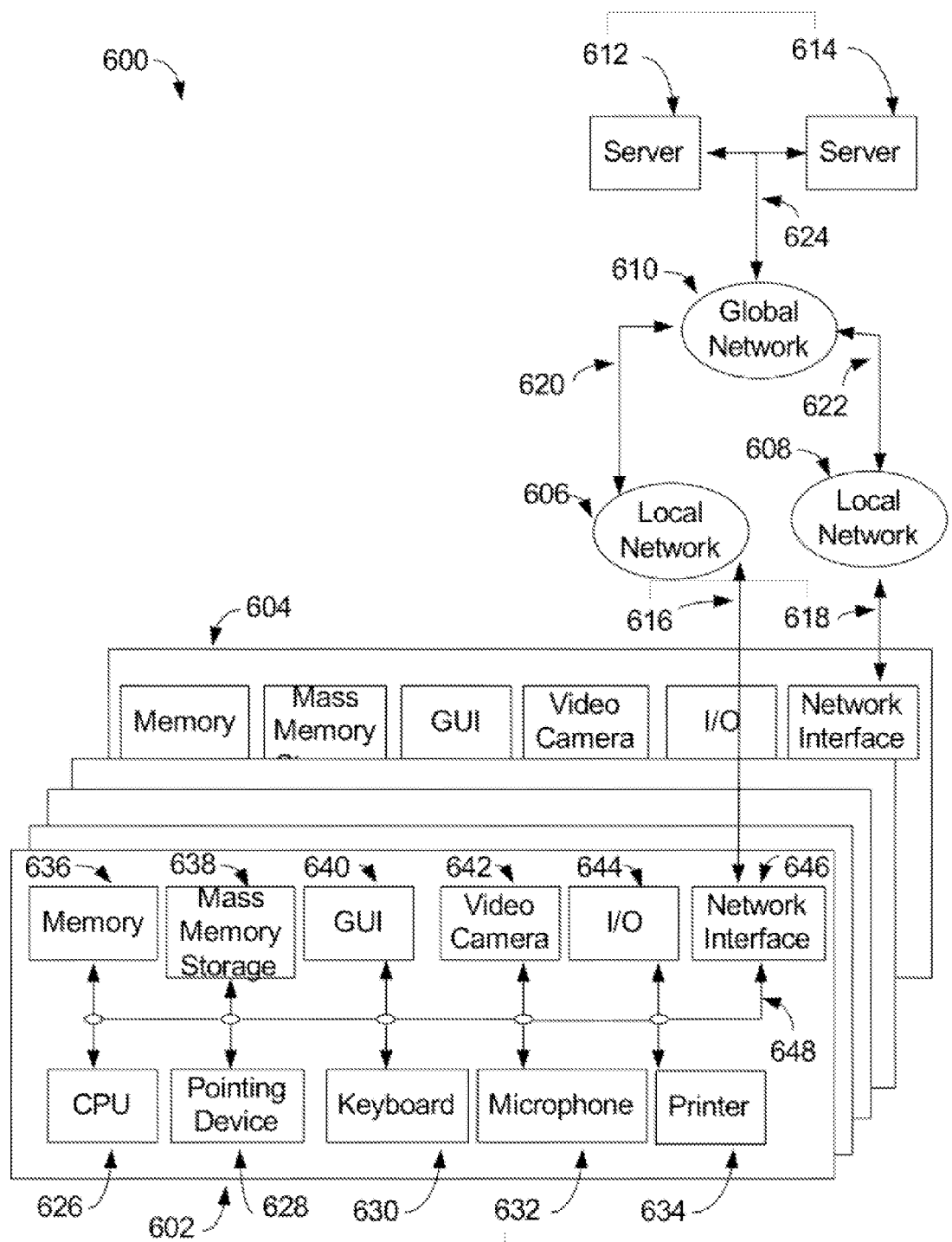
FIG. 6 illustrates a typical computer system that, when appropriately configured or designed, can serve as an exemplary method for identification, in accordance with an embodiment of the present invention.

FIG. 6 illustrates a typical computer system that, when appropriately configured or designed, can serve as an exemplary method for identification, in accordance with an embodiment of the present invention. In the present invention, a communication system 600 includes a multiplicity of clients with a sampling of clients denoted as a client 602 and a client 604, a multiplicity of local networks with a sampling of networks denoted as a local network 606 and a local network 608, a global network 610 and a multiplicity of servers with a sampling of servers denoted as a server 612 and a server 616.

Client 602 may communicate bi-directionally with local network 606 via a communication channel 616. Client 604 may communicate bi-directionally with local network 608 via a communication channel 618. Local network 606 may communicate bi-directionally with global network 610 via a communication channel 620. Local network 608 may communicate bi-directionally with global network 610 via a communication channel 622. Global network 610 may communicate bi-directionally with server 612 and server 616 via a communication channel 624. Server 612 and server 616 may communicate bi-directionally with each other via communication channel 624. Furthermore, clients 602, 604, local networks 606, 608, global network 610 and servers 612, 616 may each communicate bi-directionally with each other.

In one embodiment, global network 610 may operate as the Internet. It will be understood by those skilled in the art that communication system 600 may take many different forms. Non-limiting examples of forms for communication system 600 include local area networks (LANs), wide area networks (WANs), wired telephone networks, wireless networks, or any other network supporting data communication between respective entities.

Clients 602 and 604 may take many different forms. Non-limiting examples of clients 602 and 604 include personal computers, personal digital assistants (PDAs), cellular phones and smartphones.

Client 602 includes a CPU 626, a pointing device 628, a keyboard 630, a microphone 632, a printer 634, a memory 636, a mass memory storage 638, a GUI 660, a video camera 662, an input/output interface 664 and a network interface 666.

CPU 626, pointing device 628, keyboard 630, microphone 632, printer 634, memory 636, mass memory storage 638, GUI 660, video camera 662, input/output interface 664 and network interface 666 may communicate in a unidirectional manner or a bi-directional manner with each other via a communication channel 668. Communication channel 668 may be configured as a single communication channel or a multiplicity of communication channels.

CPU 626 may be comprised of a single processor or multiple processors. CPU 626 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 636 is used typically to transfer data and instructions to CPU 626 in a bi-directional manner. Memory 636, as discussed previously, may include any suitable computer-readable media, intended for data storage, such as those described above excluding any wired or wireless transmissions unless specifically noted. Mass memory storage 638 may also be coupled bi-directionally to CPU 626 and provides additional data storage capacity and may include any of the computer-readable media described above. Mass memory storage 638 may be used to store programs, data and the like and is typically a secondary storage medium such as a hard disk. It will be appreciated that the information retained within mass memory storage 638, may, in appropriate cases, be incorporated in standard fashion as part of memory 636 as virtual memory.

CPU 626 may be coupled to GUI 660. GUI 660 enables a user to view the operation of computer operating system and software. CPU 626 may be coupled to pointing device 628. Non-limiting examples of pointing device 628 include computer mouse, trackball and touchpad. Pointing device 628 enables a user with the capability to maneuver a computer cursor about the viewing area of GUI 660 and select areas or features in the viewing area of GUI 660. CPU 626 may be coupled to keyboard 630. Keyboard 630 enables a user with the capability to input alphanumeric textual information to CPU 626. CPU 626 may be coupled to microphone 632. Microphone 632 enables audio produced by a user to be recorded, processed and communicated by CPU 626. CPU 626 may be connected to printer 636. Printer 636 enables a user with the capability to print information to a sheet of paper. CPU 626 may be connected to video camera 662. Video camera 662 enables video produced or captured by user to be recorded, processed and communicated by CPU 626.

CPU 626 may also be coupled to input/output interface 664 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 626 optionally may be coupled to network interface 666 which enables communication with an external device such as a database or a computer or telecommunications or internet network using an external connection shown generally as communication channel 616, which may be implemented as a hardwired or wireless communications link using suitable conventional technologies. With such a connection, CPU 626 might receive information from the network, or might output information to a network in the course of performing the method steps described in the teachings of the present invention.

Figure 7:
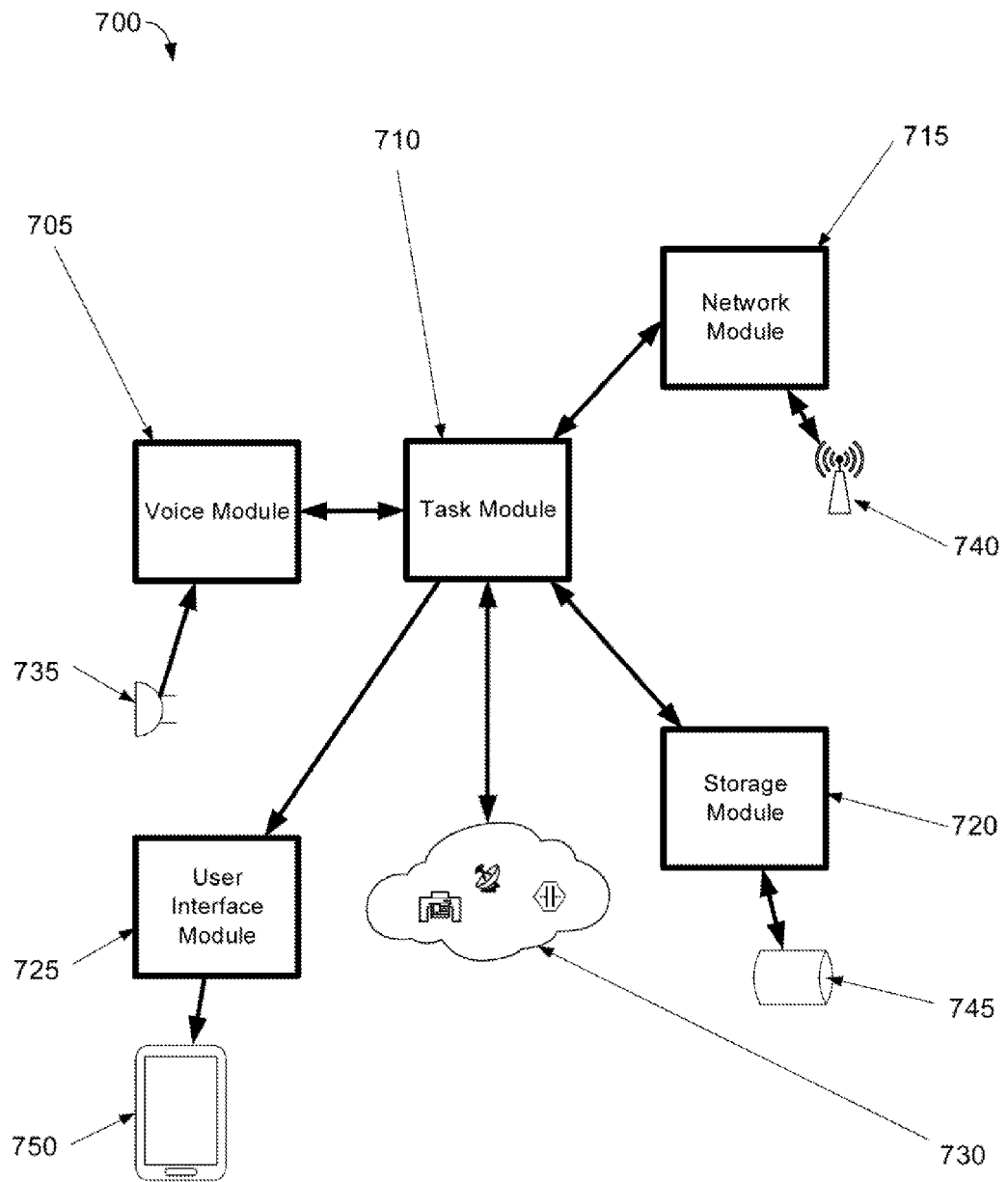
FIG. 7 illustrates the architecture of an exemplary system for voice activated device operation, in accordance with an embodiment of the present invention.

FIG. 7 illustrates the architecture of an exemplary system for voice activated device operation, in accordance with an embodiment of the present invention. Voice activated system 700 comprises of a voice module 705, a task module 710, a network module 715, a storage module 720, and a user interface module 725. Voice module 705 has a means to receive voice commands such as, but not limited to, a microphone 735 which then sends command information to task module 710. Task module 710 receives a task command and executes the task. During task execution, task module 710 may use network module 715 and/or storage module 720. Network module 715 has a means to communicate with a network such as, but not limited to, a network transceiver 740 that may be used to communicate with, but not limited to, the Internet, other devices, and/or other modules Storage module 720 may be accessed to store and/or retrieve data stored in one or more storage devices 745. Task module 710 may additionally access one or more peripherals 730 to gather data and/or resources in completing a task. Information regarding a task, such as, but not limited to, processed data, a task result, may be sent to a user interface module 725 which has a means to relay information regarding the task to a user such as, but not limited to, an information display medium 750.

It may be appreciated by a person with ordinary skill in the art that voice module 705 may perform additional processing to determine a task command from a user. Voice module 705 may perform, but not limited to, voice recognition, voice modulation, neural network algorithms. In another embodiment of the present invention, voice module 705 may implement voice recognition algorithms to identify a user and/or task commands.

It may be appreciated by a person with ordinary skill in the art that a plurality of microphones 735 may be connected to voice module 705. In an alternative embodiment of the present invention, an array of microphones may be used to determine the directionality of a user's voice or differentiate multiple users by position.

It may be appreciated by a person with ordinary skill in the art that task module 710 may be any device capable of processing. Task module 710 may be, but not limited to, a smartphone device, a computer. In an alternative embodiment of the present invention, task module 710 may be a server accessed via the Internet.

It may be appreciated by a person with ordinary skill in the art that task module 710 may receive task commands from a variety of sources. Task module 710 may receive task commands from, but not limited to, physical inputs on hardware from a user, user gestures, networks accessed by network module 715. In another embodiment of the present invention, task module 710 may receive commands from a user over a network.

It may be appreciated by a person with ordinary skill in the art that task module 710 may forward a task to network module 715 for transmission. In another embodiment of the present invention, a command may be verbally said by a user and received by voice module 705. The command may be sent to task module 710 and forwarded to network module 715. Network module 715 may send the command to another device or computer across a network for execution.

It may be appreciated by a person with ordinary skill in the art that task module 710 may execute software, computer code, and/or applets from a non-transitory computer readable medium. In another embodiment of the present invention, task module 710 may access computer code from a storage device 745 through storage module 720.

It may be appreciated by a person with ordinary skill in the art that task module 710 may have means to perform any type of task. Task module may be coupled to, but not limited to, an arithmetic logic unit, a graphics processing unit, a database. In another embodiment of the present invention, a task module 710 may be coupled with a language database and/or foreign language libraries.

It may be appreciated by a person with ordinary skill in the art that network module 715 may be used to interface with one or more different networks. Network module 715 may be used to interface with networks such as, but not limited to, a cellular network, Internet, local area network, Bluetooth network. In another embodiment of the present invention, network module 715 may act as an access point or hotspot to interface with other networks. In still another embodiment of the present invention, network module 715 may connect with a secure payment server such as, but not limited to, a banking server or online payment service.

It may be appreciated by a person with ordinary skill in the art that network transceiver 740 may be one or more of any kind of communications transceiver. Network transceiver 740 may be, but not limited to, a radio transceiver, a WIFI transceiver, a Bluetooth transceiver. In another embodiment of the present invention, network transceiver 740 is a satellite radio transceiver used for extraterrestrial communications.

It may be appreciated by a person with ordinary skill in the art that storage module 720 may access a variety of storage devices 745. Accessible storage devices may be, but not limited to, flash memory, hard drives. In another embodiment of the present invention, storage module 720 may access a heterogeneous set of storage devices.

It may be appreciated by a person with ordinary skill in the art that one or more peripherals 730 may be any type of sensors and/or electronic devices. Peripherals 730 may be, but not limited to, GPS units, temperature sensors, ECG sensors, activity wristbands, printers, smartphones. In another embodiment of the present invention, peripherals 730 may be a camera that is used to capture images and/or video.

It may be appreciated by a person with ordinary skill in the art that user interface module 725 may interface with any information display medium 750. User interface module 725 may interface with, but not limited to, screens via visual graphics, speakers via audible commands. In another embodiment of the present invention, user interface module 725 may audibly announce information through a speaker on information display medium 750.

It may be appreciated by a person with ordinary skill in the art that information display medium 750 may be any means of relaying information to a user. Information display medium 750 may be, but not limited to, a smartphone screen, a projector, a speaker. In another embodiment of the present invention, information display medium 750 may be a speaker that audibly relays information to a user. In still another embodiment of the present invention, information display medium 750 may be a project that displays information graphically to a user.

It may be appreciated by a person with ordinary skill in the art that one or more modules in voice activated system 700 may be powered by one or more power sources. Power sources may be, but not limited to, any battery and/or power generator. In one embodiment of the present invention, voice activated system 700 is powered by a single lithium ion battery. In another embodiment of the present invention, voice activated system 700 is powered by a series of electric generators such as, but not limited to, solar panels, piezoelectric strips, thermoelectric generators.

It may be appreciated by a person with ordinary skill in the art that one or more modules in voice activated system 700 may be integrated together on one or more devices. Integrated modules may be, but not limited to, a wearable communications headpiece, a computer and a wearable terminal, two ear buds, big headphones, wearable around the neck headphones, one wearable ear piece. In another embodiment of the present invention, all modules are integrated in a waterproof earpiece.

Figure 8:
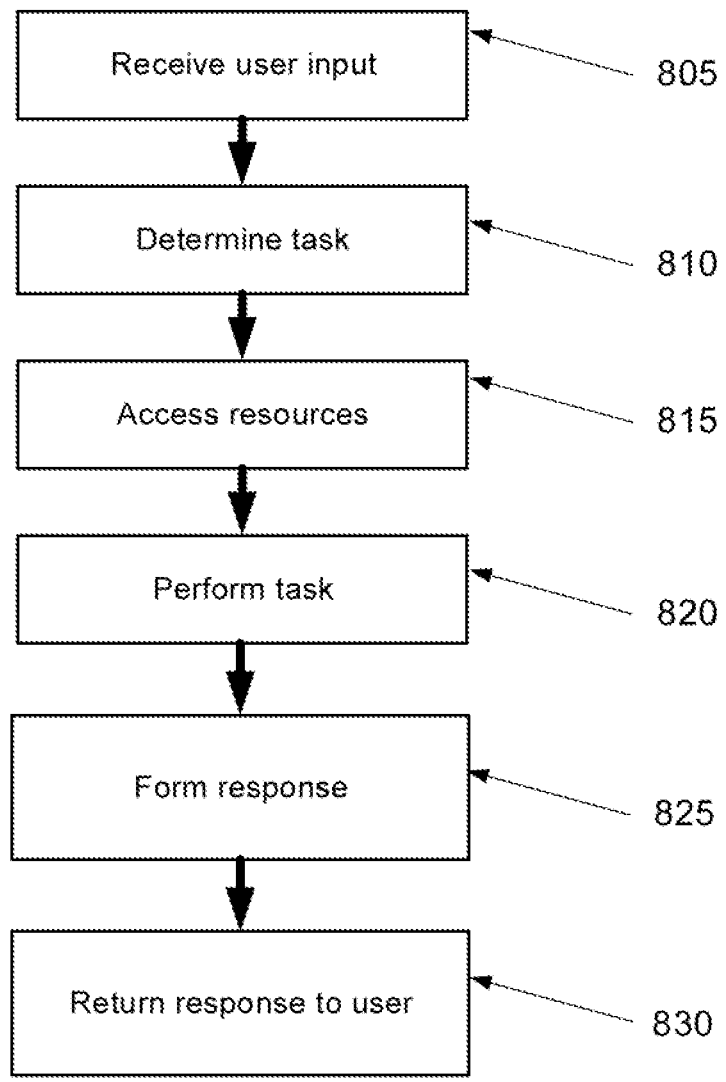
FIG. 8 is a flow chart illustrating an exemplary process for voice activated device operation, in accordance with an embodiment of the present invention.

FIG. 8 is a flow chart illustrating an exemplary process for voice activated device operation, in accordance with an embodiment of the present invention. Voice activated device operation process 800 begins at a receive user input step 805. User input is received and a task is determined in a determine task step 810. Resources to execute the task may be accessed in an access resources step 815. The task may be performed in a perform task step 820. Any results and/or information produced during and/or after task execution are formed for user consumption in form response step 825. A formed response may then be sent to a user for review in a return response to user step 830.

Receive user input step 805 may receive input from a variety of sources such as, but not limited to, a voice module, an input response from physical hardware, a user gesture. In another embodiment of the current invention, receive user input step 805 may receive user input from a touch screen on an electronic device.

Determine task step 810 may receive task information in various ways such as, but not limited to, a data stream from peripherals, a network connection. In another embodiment of the current invention, determine task step 810 may receive a command from a voice module and receive parameters or metadata within and/or after the command sent from the voice module.

It may be appreciated by a person with ordinary skill in the art that the resources accessed in access resources step 815 may be any form of resource. Resources accessed may be, but not limited to, network packets, information stored in non-transitory computer readable mediums, peripheral sensors. In another embodiment of the present invention, access resources step 815 may access a library from a storage medium and/or a network.

It may be appreciated that a form response step 825 may form any type of response. Response may be, but not limited to, a string of data, an image graphic, an audio recording. In another embodiment of the present invention, a response generated in form response step 825 may be an audio playback of text stored in a storage medium and/or network. In still another embodiment of the present invention, a response generated in form response step 825 may trigger another task and/or send commands across a network.

It may be appreciated by a person with ordinary skill in the art that one or more steps in the voice activated device operation process 800 may be added, removed, or rearranged. In another embodiment of the present invention, voice activated device operation process 800 may omit steps of In still another embodiment of the present invention, the order of steps in voice activated device operation process 800 may occur in any order. In still another embodiment of the present invention, additional steps such as, but not limited to, extrapolating information from user commands may be added to the voice activated device operation process 800.

Figure 9:
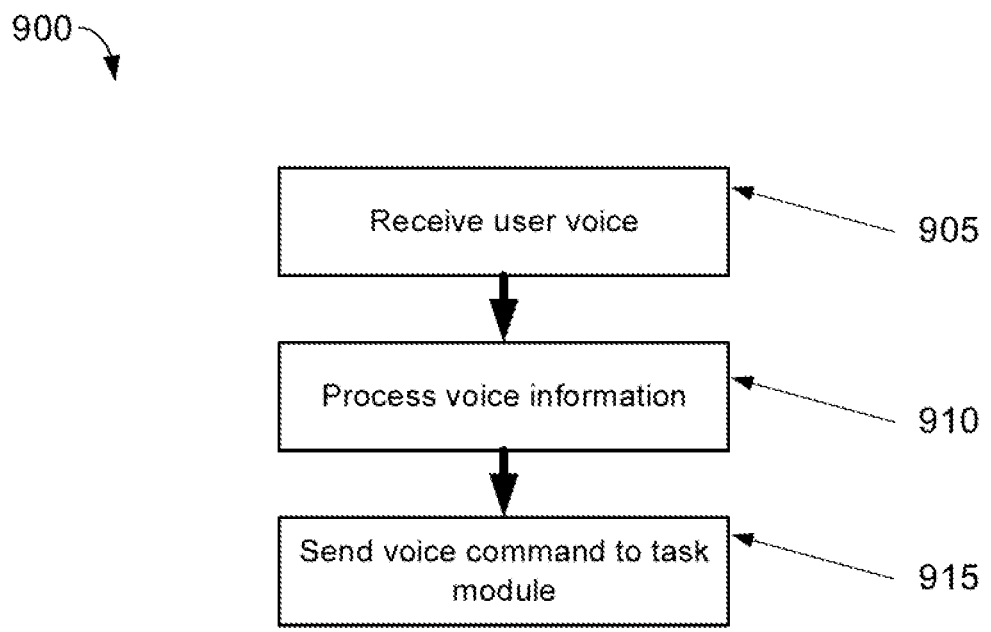
FIG. 9 is a flow chart illustrating an exemplary process for acquiring voice commands on a voice module, in accordance with an embodiment of the present invention.

FIG. 9 is a flow chart illustrating an exemplary process for acquiring voice commands on a voice module, in accordance with an embodiment of the present invention. An acquiring voice commands process 900 begins at a receive user voice step 905. A user's voice is processed in a process voice information step 910 and a set of voice command information is extracted. The set of voice command information is sent to a task module in a send voice command to task module step 915.

It may be appreciated by a person with ordinary skill in the art that any form of processing may occur at process voice information step 910. Processing may be, but not limited to, voice recognition, encryption, modulation. In another embodiment of the present invention, process voice information step 910 may identify a specific user.

It may be appreciated by a person with ordinary skill in the art that a user's voice may also contain command information and/or metadata. A user's voice may contain information such as, but not limited to, command parameters, security phrases, multiple commands. In an alternative embodiment of the present invention, information such as a user's desired priority for a command may be extrapolated from a user's voice.

It may be appreciated by a person with ordinary skill in the art that one or more steps in the acquiring voice commands process 900 may be added, removed, or rearranged. In another embodiment of the present invention, acquiring voice commands process 900 may omit steps of. In still another embodiment of the present invention, the order of steps in acquiring voice commands process 900 may occur in any order. In still another embodiment of the present invention, additional steps such as, but not limited to, may be added to the acquiring voice commands process 900.

Figure 10:
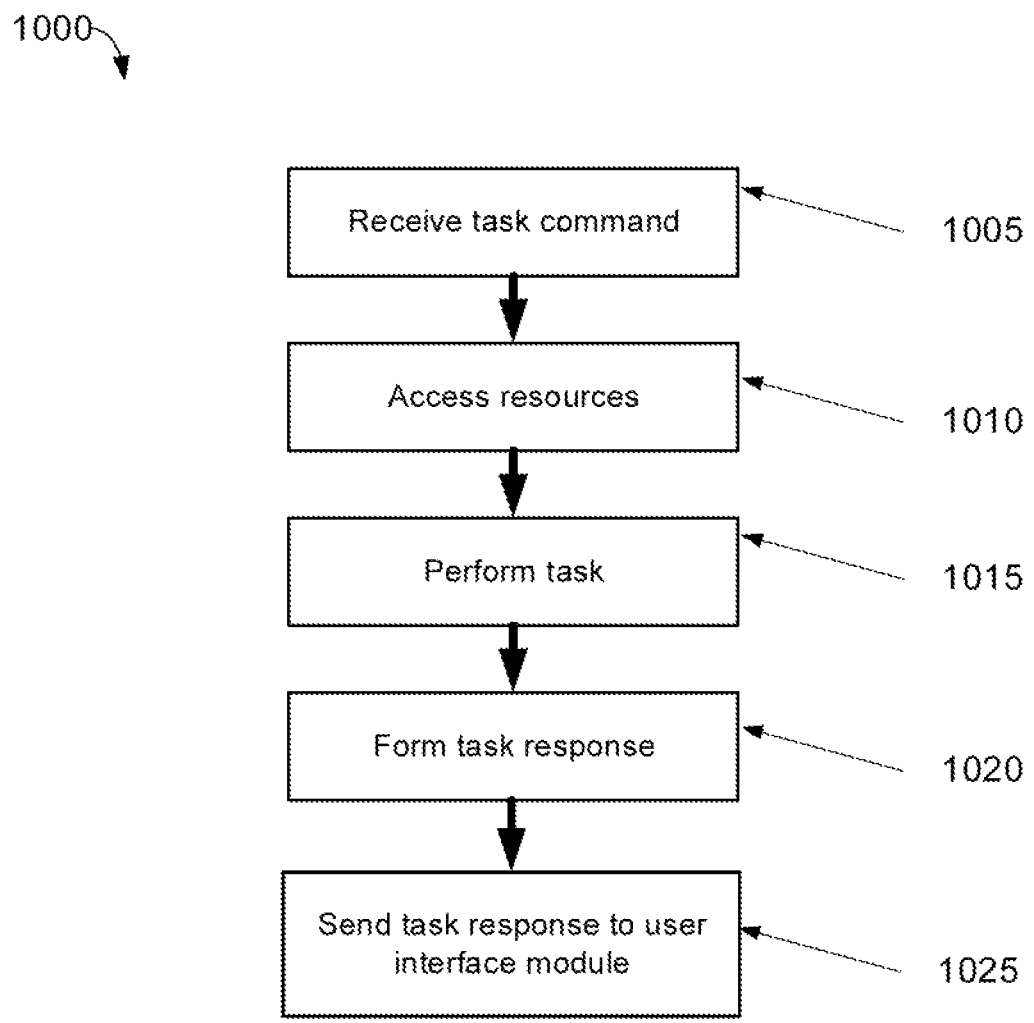
FIG. 10 is a flow chart illustrating an exemplary process for task execution on a task module, in accordance with an embodiment of the present invention.

FIG. 10 is a flow chart illustrating an exemplary process for task execution on a task module, in accordance with an embodiment of the present invention. A task execution process 1000 beings at a receive task command step 1005. A task module determines which resources must be accessed to complete a task command in an access resources step 1010. A perform task step 1015 performs the task command and any results and/or information is used to form a task response in a form task response step 1020. The formed task response is sent to a user interface module to be relayed to a user in a send task response to user interface module step 1025.

It may be appreciated by a person with ordinary skill in the art that a task module may execute intermediary steps to access a resource in access resources step 1010. Intermediary steps may include, but not limited to, sending a network connection request, calculating memory addresses for a storage medium, In another embodiment of the present invention, access resources step 1010 may include pairing with a peripheral wireless device.

It may be appreciated by a person with ordinary skill in the art that a task command may be received in receive task command step 1005 from nearly any source. A task command may be received from a network module, voice module, coupled peripheral, In another embodiment of the present invention, a task command may be received from a device across a network.

It may be appreciated by a person with ordinary skill in the art that one or more steps in the task execution process 1000 may be added, removed, or rearranged. In another embodiment of the present invention, acquiring task execution process 1000 may omit steps of. In still another embodiment of the present invention, the order of steps in task execution process 1000 may occur in any order. In still another embodiment of the present invention, additional steps such as, but not limited to, may be added to the task execution process 1000.

Figure 11:
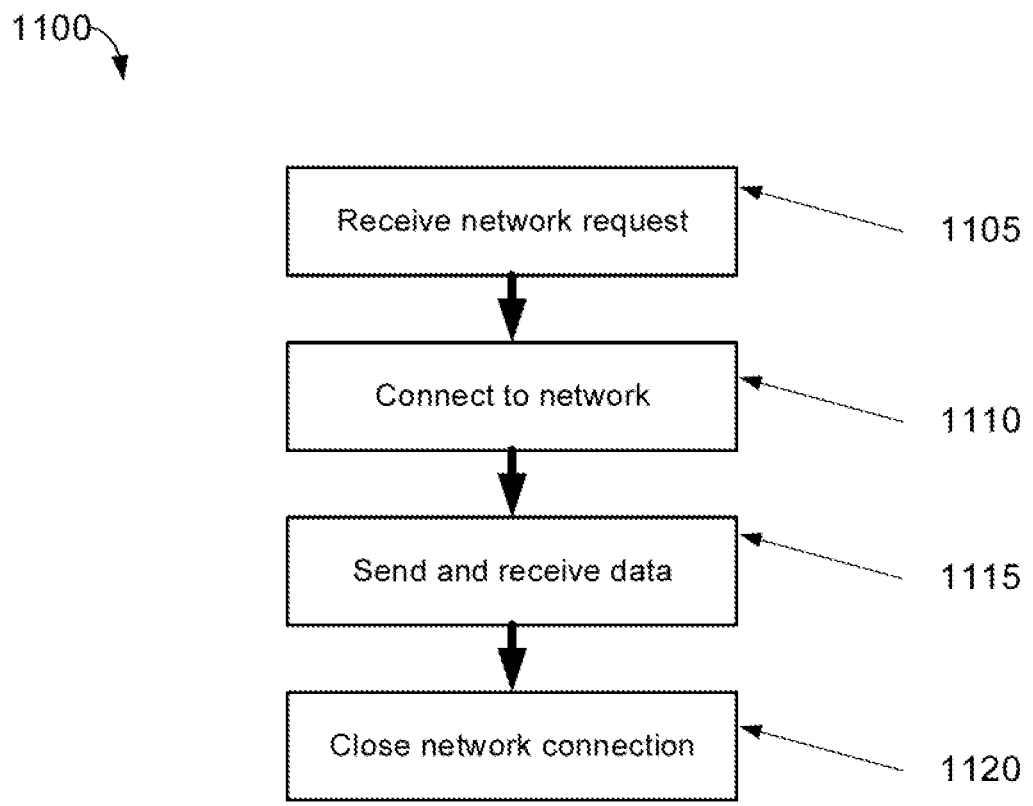
FIG. 11 is a flow chart illustrating an exemplary process for network communication on a network module, in accordance with an embodiment of the present invention.

FIG. 11 is a flow chart illustrating an exemplary process for network communication on a network module, in accordance with an embodiment of the present invention. A network communication process 1100 begins at a receive network request step 1105. A connection to a network is made in a connect to network step 1110. Data may be sent and/or received across a network in a send and receive data step 1115. Once communications are complete and the network no longer needs to be accessed, a close network connection step 1120 is performed.

It may be appreciated by a person with ordinary skill in the art that network communication process 1100 may connect to a plurality of heterogeneous networks. Network communication process 1100 may connect to networks such as, but not limited to, Bluetooth networks, WIFI, radio frequencies. In another embodiment of the present invention, network communication process 1100 may act as a wireless access point by connecting to a wired network via a coupled cable and a wireless network.

It may be appreciated by a person with ordinary skill in the art that one or more steps in the network communication process 1100 may be added, removed, or rearranged. In another embodiment of the present invention, network communication process 1100 may omit steps of. In still another embodiment of the present invention, the order of steps in network communication process 1100 may occur in any order. In still another embodiment of the present invention, additional steps such as, but not limited to, may be added to the network communication process 1100.

Figure 12:
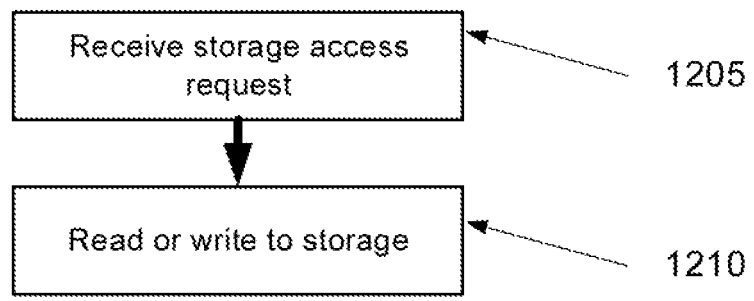
FIG. 12 is a flow chart illustrating an exemplary process for data storage on a storage module, in accordance with an embodiment of the present invention.

FIG. 12 is a flow chart illustrating an exemplary process for data storage on a storage module, in accordance with an embodiment of the present invention. A data storage process 1200 begins at a receive storage access request step 1205. After receiving a request, one or more storage mediums may be accessed for data reading and/or writing in a read or write to storage step 1210.

It may be appreciated by a person with ordinary skill in the art that a plurality of storage mediums may be accessed in data storage process 1200. In an alternative embodiment of the present invention, data storage process 1200 may access heterogeneous storage mediums such as a networked database and a local device memory card simultaneously.

It may be appreciated by a person with ordinary skill in the art that one or more steps in the data storage process 1200 may be added, removed, or rearranged. In another embodiment of the present invention, data storage process 1200 may omit steps of. In still another embodiment of the present invention, the order of steps in data storage process 1200 may occur in any order. In still another embodiment of the present invention, additional steps such as, but not limited to, may be added to the data storage process 1200.

Figure 13:
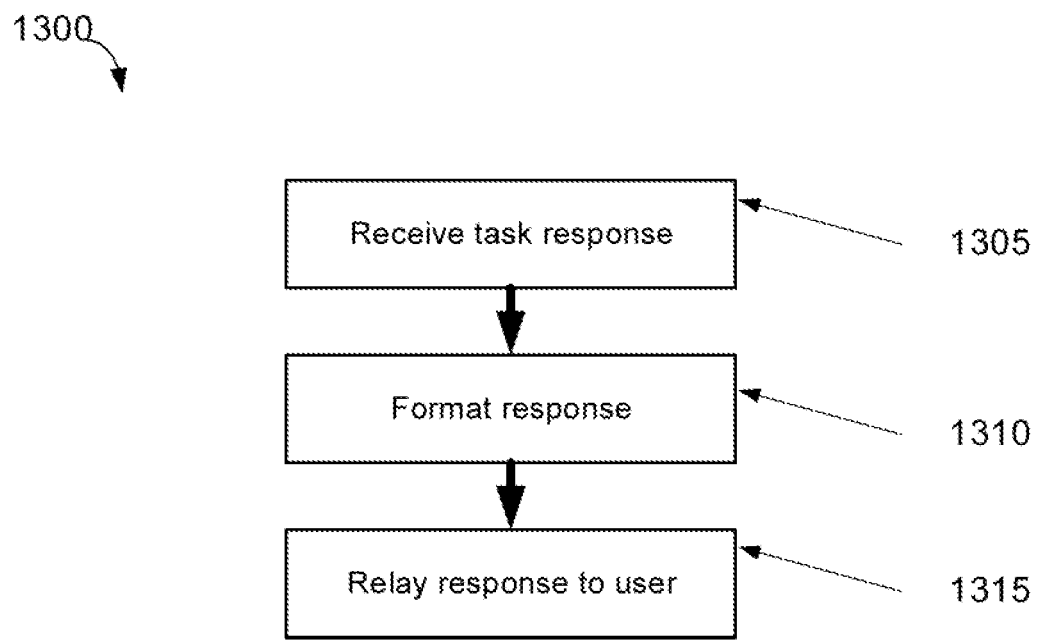
FIG. 13 is a flow chart illustrating an exemplary process for user interaction on a user interface module, in accordance with an embodiment of the present invention.

FIG. 13 is a flow chart illustrating an exemplary process for user interaction on a user interface module, in accordance with an embodiment of the present invention. A user interaction process 1300 begins at a receive task response step 1305 which includes receiving a task result and/or task data. The received task result and/or task data may be formatted for relaying to a user in a format response step 1310. The formatted response may be relayed to a user in a relay response to user step 1315.

It may be appreciated by a person with ordinary skill in the art that a response may be formatted according to a variety of parameters in format response step 1310. A response may be formatted according to, but not limited to, response data, user device hardware specifications, user preferences. In another embodiment of the present invention, a task response may be converted to an audio file and played back to a user through a speaker.

It may be appreciated by a person with ordinary skill in the art that one or more steps in the user interaction process 1300 may be added, removed, or rearranged. In another embodiment of the present invention, user interaction process 1300 may omit steps of. In still another embodiment of the present invention, the order of steps in user interaction process 1300 may occur in any order. In still another embodiment of the present invention, additional steps such as, but not limited to, may be added to the user interaction process 1300.

What follows is a raw listing of a multiplicity of features which any of the previous embodiments of the communication device of the present invention may additionally include in any suitable combination:

1. a voice ID banking system. You turn on the device by audible command and you state your name to access the Bank of your choice. Once accessed you give the bank your information etc. to utilize the banking system.
2. a credit card bill payment system. You turn on the device by audible command then pick the credit card feature, state your credit card information then it is saved on the device to be used online
3. a wireless point of sale payment system. You enter an establishment and you are automatically connected to their wireless checkout system, once connected your payment information etc. is synced to their system. When you checkout you are alerted by the PDA voice feature to approve the purchase by the voice ID system.
4. A voice command recognition payment system that you can just check out purchases by walking by the stores check out system.
5. It has an audible credit card bill payment voice recognition system, you log in your credit card info and state your name and the system remembers your name info etc. to pay bills, you can also order merchandise off the internet.
6. A voice command recognition payment system that you can just check out purchases by walking by the stores remote wireless checkout system. a car remote control module, which is operable for remotely controlling at least some operations of the car including, without limitation, to unlock car doors, windows, trunks, turn the car off and on, set the alarm off and on, find the car, and link up your music and internet to listen to it in your car. You access the car remote feature by saying car then stating your name.
7. It has an audible voice activation car working system to unlock car doors, windows, trunks, turn the car off and on, set the alarm off and on, find the car, link up your music and internet to listen to it in your car.
8. a computer remote control module, which is configured to be operable for remotely controlling at least some operations of another computer; You access this feature by saying computer remote, then you are synced to the computers, once synced you can control them by Bluetooth technology and Wifi technology by voice command.
9. a waterproof camera. The device is waterproof up until 100 feet.
10. a projector, to project pictures/videos, internet, movies, TV, text, emails etc. to any wall. The projector, is configured to be operable for projecting the display content of said communication device onto a nearby wall. You access this feature by saying the command projector, once accessed you pick the information you want projected by voice command then stand at least three feet in front of any wall and the images are displayed on the wall in color. You also control the projector by voice command.
11. a motion sensor operable to detect motion near said communication device. The motion detection feature is a feature to control the devices volume, power feature, and the movement of the projector.
12. It remembers and files calls by name audibly and speaks contacts back to you in alphabetical order and recognizes your voice and speaks to you by your name and answers by the name you give it and vibrates when a call comes in.
13. It has an answering machine that you can program to give preprogrammed messages to people when they call you, from the PDA system. You access the PDA system by name then state the message and the person name you want it to be given to when they call. You can also send messages to people on a specific time, and date you want it to be delivered.
14. It dictates/writes to other devices in any language spoken or written and sends the messages on a specific day and time by a PDA system.
15. It has a video camera & camera that works by audible command, you can send images/video to people through the internet, email, text, Instagram, Facebook etc. or by the cloud instantly to any device, you can also add an audio or written message to the images/videos, the camera is also water proof to take underwater footage. You access this feature by saying camera, which then gives you control of the cameras features to film take photos etc.

the camera also has a scanner that scans bar codes tells you the name and price of the item and pays for the items, it also scans documents and you can print them out and save them. Camera also has a sensor in it to pick up hand motions to activate the device to receive calls. You access this feature by saying scanner then you look at the item by placing it at least one foot in front of you. It has a solar powered battery that holds a charge and the capability to be charged by your body heat.
16. The device is water proof to listen to audibly underwater. The device is waterproof up until 100 feet.
17. The device has a USB port/flash drive capability to transfer information to other devices or to just save on a flash drive, all done by audible command. You hook up the USB cable or the OTG flash drive to transfer the information back and forth from the device to other devices.

18. Has the capability to check your pulse, heart rate, and temperature and gives the results audibly. The devices ear piece has the capability to do this feature. You state the desired feature to access the operation.
19. All the features/operating systems for the device can be downloaded to the device wirelessly from the cloud or internet by just saying your email address and name into the device once accessed you give the audible command to download the desired operational system.
20. Device also makes WIFI calling and has WIFI internet connection capability. You access this feature by saying turn on WIFI calling or WIFI internet.
21. Has multiple mobile hotspot capability. You access this feature by saying hotspot connector, once accessed you give the command to turn it on and the device is turned into a mobile hotspot.
22. a voice recognition module, which is configured to be operable to turn said communication device off & on. You state your name into the devices voice ID system, once cleared you can turn the device off and on.
23. a vital signs measurement module, which is configured with conventional sensors and signal processing algorithms operable to monitor a user's heart rate and/or body temperature. The ear piece has the capability to work this feature.
24. A cell phone that works by audible commands no additional phone needed to operate, also works with other cell phones by Bluetooth when no phone service is activated.
25. Has internet capability, you listen to the web in every spoken language, audio web site needed. You access the internet by saying internet, once accessed you can use the internets.
26. Has spoken recorded notes capability, you can transfer the notes with a USB cord OTG flash drive or wirelessly to a printer to print out or to a cloud, TV, computer, cell phone to save and edit. You access this feature by saying notepad, once accessed you can operate the many features.
27. Has the capability to download music with a USB cord, OTG flash drive or wirelessly with audible commands, you can also save downloaded music from a music streaming application. You access this feature by saying my music.
28. The phone is compatible with a car stereo, home stereo, and TV as a audible command remote control. You access this feature by saying sync to the specific device you want to connect to, to control.
29. Works with a cell phone, tablet, desk top computer or pc to transfer audible spoken conversations printed out on these devices screens. You control and access this feature by saying data transfer, once connected you sync the device by Bluetooth to print data on other devices.
30. A touch screen on the device that numbers display on it and you rub your finger across the screen to accept calls and change functions also you can turn the device on and off and control the volume by voice command.
31. It remembers and files calls by name audibly and speaks contacts back to you in alphabetical order and recognizes your voice and speaks to you by your name and answers by the name you give it and vibrates when a call comes in.
32. It transmits emails and texts typed messages spoken or written to you and from you in every language.
33. It has an multiple language audible GPS system that tells you your location and instructs you audibly where you want to go by plane, boat, train, bus, car or on foot. You access this feature by saying GPS, once accessed you instruct the GPS system to reach the desired location.
34. It has an audible language changer feature from any spoken language, visa versa. You speak one language and it comes out as another. You access this feature by saying language changer, you then pick the language you want it to be changed to or from.
35. It has an audible calculator that solves all math problems. You access this feature by saying calculator, once accessed you state the mathematical problem and the device solves it.
36. It has a multiple language audible dictionary that you can describe anything in words and the dictionary will give you a word for it. It also gives you the definition to any word. You access this feature by saying dictionary.
37. It has an audible voice recognition banking ID system that you do personal banking with, make wire money transfers etc.
38. It has audible command music sharing feature that you can share music with other devices. You access this feature by saying music sharing, then give the email address or phone number to share the music.
39. It has AM/FM radio, internet radio and satellite radio capabilities. You access this feature by stating the desired music feature you want to use.
40. It has an audible encyclopedia that you can ask questions and it gives you answers. You access this feature by saying encyclopedia then ask it the information you are trying to retrieve.
41. It announces and makes calls by name and number in every spoken language.
42. It downloads contact list, music, books, applications, from computer devices, the internet or the cloud with a USB cord, OTG flash drive or wirelessly.
43. It has an audible voice activation car working system to unlock car doors, windows, trunks, turn the car off and on, set the alarm off and on, find the car, link up your music and internet to listen to it in your car.
44. It has an answering machine that you can program to give preprogrammed messages to people when they call you from a PDA system.
45. It has a clock you program by voice command that speaks the date and time when asked. You access this feature by saying clock or PDA's name and ask for the time, weather etc.
46. It dictates/writes to other devices in any language spoken or written and sends the messages on a specific day and time by a PDA system. You can send messages from the notepads feature to any device. You access this feature by saying notepad.
47. It has an audible translator that translates any spoke language. You access this feature by saying translator, once accessed you just say a word and it translates it.
48. It has a solar powered battery that holds a charge and the capability to be charged by your body heat.
49. It has the capability to remotely control computer devices by voice command.
50. It can be designed to have two ear pieces like ear buds, big headphones, wearable headset around the neck, and a one ear worn device.
51. The device is water proof to listen to audibly underwater.
52. The device has a USB port/flash drive capability to transfer information to other devices or to just save on a flash drive, all done by audible command.

53. Audio books library you can buy and save books from the internet or listen to your kindle app library. You access this feature by saying book library, once accessed it will give you a listing of your books etc. then you choose them to listen to.
54. The device syncs with Bluetooth stereo system speakers. You access this feature by saying Bluetooth connect, once found it will automatically sync.
55. Has the capability to check your pulse, heart rate, and temperature and gives the results audibly.
56. Has a PDA that makes calls, emails, texts, and shops online for you on a specified day and time. The PDA system has the capability to do all of these features independently.
57. A voice command recognition system to turn the device on and off.
58. All the features/operating systems for the device can be downloaded to the device wirelessly from the cloud or internet by just saying your email address and name into the device.
59. Device also makes WIFI calling and has WIFI internet connection capability.
60. Has multiple mobile hotspot capability.

Figure 14:
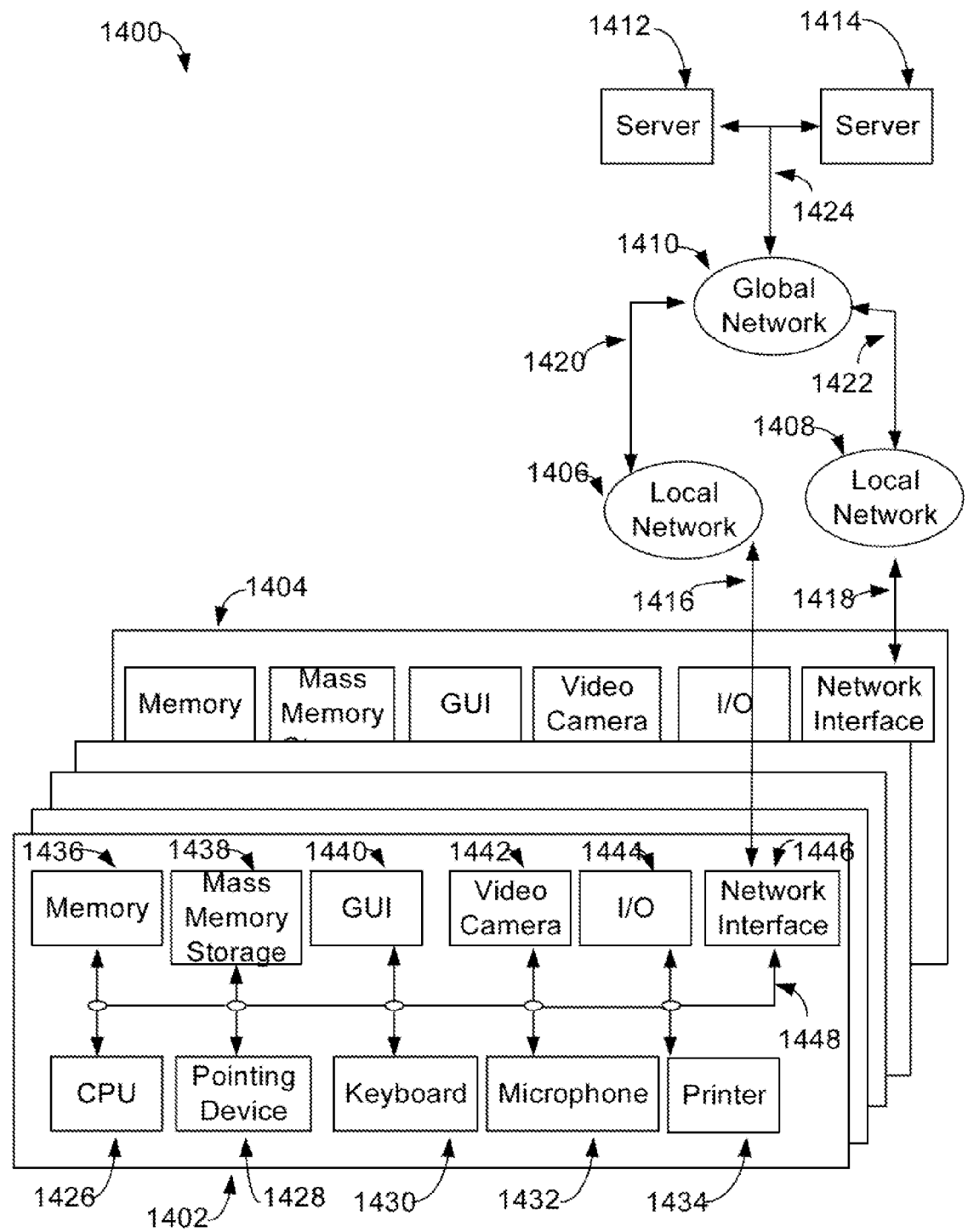
FIG. 14 is a block diagram depicting an exemplary client/server system which may be used by an exemplary web-enabled/networked embodiment of the present invention.

FIG. 14 is a block diagram depicting an exemplary client/server system which may be used by an exemplary web-enabled/networked embodiment of the present invention.

A communication system 1400 includes a multiplicity of clients with a sampling of clients denoted as a client 1402 and a client 1404, a multiplicity of local networks with a sampling of networks denoted as a local network 1406 and a local network 1408, a global network 1410 and a multiplicity of servers with a sampling of servers denoted as a server 1412 and a server 1414.

Client 1402 may communicate bi-directionally with local network 1406 via a communication channel 1416. Client 1404 may communicate bi-directionally with local network 1408 via a communication channel 1418. Local network 1406 may communicate bi-directionally with global network 1410 via a communication channel 1420. Local network 1408 may communicate bi-directionally with global network 1410 via a communication channel 1422. Global network 1410 may communicate bi-directionally with server 1412 and server 1414 via a communication channel 1424. Server 1412 and server 1414 may communicate bi-directionally with each other via communication channel 1424. Furthermore, clients 1402, 1404, local networks 1406, 1408, global network 1410 and servers 1412, 1414 may each communicate bi-directionally with each other.

In one embodiment, global network 1410 may operate as the Internet. It will be understood by those skilled in the art that communication system 1400 may take many different forms. Non-limiting examples of forms for communication system 1400 include local area networks (LANs), wide area networks (WANs), wired telephone networks, wireless networks, or any other network supporting data communication between respective entities.

Clients 1402 and 1404 may take many different forms. Non-limiting examples of clients 1402 and 1404 include personal computers, personal digital assistants (PDAs), cellular phones and smartphones.

Client 1402 includes a CPU 1426, a pointing device 1428, a keyboard 1430, a microphone 1432, a printer 1434, a memory 1436, a mass memory storage 1438, a GUI 1440, a video camera 1442, an input/output interface 1444, and a network interface 1446.

CPU 1426, pointing device 1428, keyboard 1430, microphone 1432, printer 1434, memory 1436, mass memory storage 1438, GUI 1440, video camera 1442, input/output interface 1444 and network interface 1446 may communicate in a unidirectional manner or a bi-directional manner with each other via a communication channel 1448. Communication channel 1448 may be configured as a single communication channel or a multiplicity of communication channels.

CPU 1426 may be comprised of a single processor or multiple processors. CPU 1426 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 1436 is used typically to transfer data and instructions to CPU 1426 in a bi-directional manner. Memory 1436, as discussed previously, may include any suitable computer-readable media, intended for data storage, such as those described above excluding any wired or wireless transmissions unless specifically noted. Mass memory storage 1438 may also be coupled bi-directionally to CPU 1426 and provides additional data storage capacity and may include any of the computer-readable media described above. Mass memory storage 1438 may be used to store programs, data and the like and is typically a secondary storage medium such as a hard disk. It will be appreciated that the information retained within mass memory storage 1438, may, in appropriate cases, be incorporated in standard fashion as part of memory 1436 as virtual memory.

CPU 1426 may be coupled to GUI 1440. GUI 1440 enables a user to view the operation of computer operating system and software. CPU 1426 may be coupled to pointing device 1428. Non-limiting examples of pointing device 1428 include computer mouse, trackball and touchpad. Pointing device 1428 enables a user with the capability to maneuver a computer cursor about the viewing area of GUI 1440 and select areas or features in the viewing area of GUI 1440. CPU 1426 may be coupled to keyboard 1430. Keyboard 1430 enables a user with the capability to input alphanumeric textual information to CPU 1426. CPU 1426 may be coupled to microphone 1432. Microphone 1432 enables audio produced by a user to be recorded, processed and communicated by CPU 1426. CPU 1426 may be connected to printer 1434. Printer 1434 enables a user with the capability to print information to a sheet of paper. CPU 1426 may be connected to video camera 1442. Video camera 1442 enables video produced or captured by user to be recorded, processed and communicated by CPU 1426.

CPU 1426 may also be coupled to input/output interface 1444 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1426 optionally may be coupled to network interface 1446 which enables communication with an external device such as a database or a computer or telecommunications or internet network using an external connection shown generally as communication channel 1416, which may be implemented as a hardwired or wireless communications link using suitable conventional technologies. With such a connection, CPU 1426 might receive information from the network, or might output information to a network in the course of performing the method steps described in the teachings of the present invention.

Figure 15:
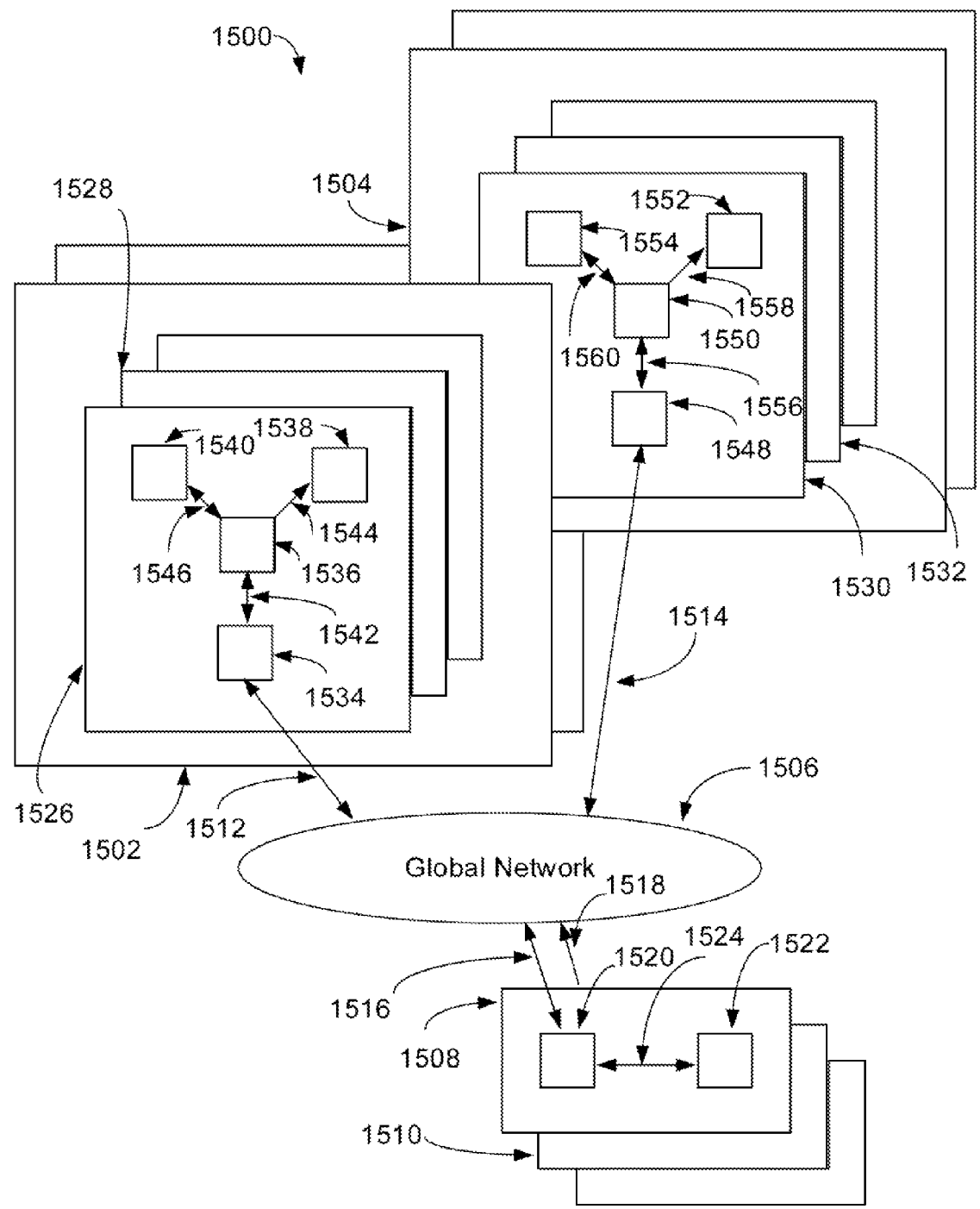
FIG. 15 illustrates a block diagram depicting a conventional client/server communication system.

FIG. 15 illustrates a block diagram depicting a conventional client/server communication system.

A communication system 1500 includes a multiplicity of networked regions with a sampling of regions denoted as a network region 1502 and a network region 1504, a global network 1506 and a multiplicity of servers with a sampling of servers denoted as a server device 1508 and a server device 1510.

Network region 1502 and network region 1504 may operate to represent a network contained within a geographical area or region. Non-limiting examples of representations for the geographical areas for the networked regions may include postal zip codes, telephone area codes, states, counties, cities and countries. Elements within network region 1502 and 1504 may operate to communicate with external elements within other networked regions or within elements contained within the same network region.

In some implementations, global network 1506 may operate as the Internet. It will be understood by those skilled in the art that communication system 1500 may take many different forms. Non-limiting examples of forms for communication system 1500 include local area networks (LANs), wide area networks (WANs), wired telephone networks, cellular telephone networks or any other network supporting data communication between respective entities via hardwired or wireless communication networks. Global network 1506 may operate to transfer information between the various networked elements.

Server device 1508 and server device 1510 may operate to execute software instructions, store information, support database operations and communicate with other networked elements. Non-limiting examples of software and scripting languages which may be executed on server device 1508 and server device 1510 include C, C++, C# and Java.

Network region 1502 may operate to communicate bi-directionally with global network 1506 via a communication channel 1512. Network region 1504 may operate to communicate bi-directionally with global network 1506 via a communication channel 1514. Server device 1508 may operate to communicate bi-directionally with global network 1506 via a communication channel 1516. Server device 1510 may operate to communicate bi-directionally with global network 1506 via a communication channel 1518. Network region 1502 and 1504, global network 1506 and server devices 1508 and 1510 may operate to communicate with each other and with every other networked device located within communication system 1500.

Server device 1508 includes a networking device 1520 and a server 1522. Networking device 1520 may operate to communicate bi-directionally with global network 1506 via communication channel 1516 and with server 1522 via a communication channel 1524. Server 1522 may operate to execute software instructions and store information.

Network region 1502 includes a multiplicity of clients with a sampling denoted as a client 1526 and a client 1528. Client 1526 includes a networking device 1534, a processor 1536, a GUI 1538 and an interface device 1540. Non-limiting examples of devices for GUI 1538 include monitors, televisions, cellular telephones, smartphones and PDAs (Personal Digital Assistants). Non-limiting examples of interface device 1540 include pointing device, mouse, trackball, scanner and printer. Networking device 1534 may communicate bi-directionally with global network 1506 via communication channel 1512 and with processor 1536 via a communication channel 1542. GUI 1538 may receive information from processor 1536 via a communication channel 1544 for presentation to a user for viewing. Interface device 1540 may operate to send control information to processor 1536 and to receive information from processor 1536 via a communication channel 1546. Network region 1504 includes a multiplicity of clients with a sampling denoted as a client 1530 and a client 1532. Client 1530 includes a networking device 1548, a processor 1550, a GUI 1552 and an interface device 1554. Non-limiting examples of devices for GUI 1538 include monitors, televisions, cellular telephones, smartphones and PDAs (Personal Digital Assistants). Non-limiting examples of interface device 1540 include pointing devices, mousse, trackballs, scanners and printers. Networking device 1548 may communicate bi-directionally with global network 1506 via communication channel 1514 and with processor 1550 via a communication channel 1556. GUI 1552 may receive information from processor 1550 via a communication channel 1558 for presentation to a user for viewing. Interface device 1554 may operate to send control information to processor 1550 and to receive information from processor 1550 via a communication channel 1560.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC §112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC §112 (6).

It is noted that according to USA law, all claims must be set forth as a coherent, cooperating set of limitations that work in functional combination to achieve a useful result as a whole. Accordingly, for any claim having functional limitations interpreted under 35 USC §112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC §112 (6) is/(are) dependent on one or more remote servers located outside the USA, it is intended that each such recited function under 35 USC §112 (6) is to be interpreted as the function of the local system receiving the remotely generated information required by a locally implemented claim limitation, wherein the structures and or steps which enable, and breathe life into the expression of such functions claimed under 35 USC §112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC §112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing wearable communication systems with voice activated operation according to the present invention will be apparent to those skilled in the art. Various aspects of the invention have been described above by way of illustration, and the specific embodiments disclosed are not intended to limit the invention to the particular forms disclosed. The particular implementation of the wearable communication systems with voice activated operation may vary depending upon the particular context or application. By way of example, and not limitation, the wearable communication systems with voice activated operation described in the foregoing were principally directed to personal electronic device implementations; however, similar techniques may instead be applied to electric vehicles, medical equipment, and consumer electronics for the disabled, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An ear worn communication device that works independently comprising:
   an ear mounting member being configured to be operable to at least partially engage with an ear, wherein said ear mounting member comprises a hook shape configured to at least partially wrap around the ear, said ear worn communication device being configured to be operable to initiate a communication in response to an audible command, said ear worn communication device being further configured with a speak recognition function to be operable to perform at least one function with said audible command, said ear worn communication device being further configured to exchange data with an external processor, said ear worn communication device further being further configured as a remote control that is operable to control at least a some of the features or functions listed below, said ear worn communication device being further configured to comprise:
   a communication processor configured to initiate said communication in response to said audible command;
   a microphone operatively connected with said communication processor, said microphone is configured to receive said audible command;
   a task module, said task module receives said audible command from said microphone to perform a voice activated operation;
   a network module, said network module is configured to receive a task operation from said task module, wherein said network module is further configured to send said task operation to at least one of an external computer for execution;
   in which said microphone comprises an array of microphones that is configured to determine the directionality of said audible command, and wherein said array of microphones is further configured to differentiate multiple audible commands by position;
   a speaker configured to transmit communications received form an external communication device, in which said speaker comprising an adjustable volume configured to be operable with said audible command;
   a power port configured to receive a power cord for connecting to an external power source;
   a data port configured to receive a data cord for exchanging data with the external processor, said data port comprising at least a fiber optic data port and said data cord comprising at least fiber optic cable;
   a database of contacts;
   a display configured to display said contacts from said database of contacts, said display comprising at least a touch screen configured to allow for initiating and receiving of communications from said contacts and to control communication device functions;
   a Bluetooth speaker connection;
   a digital book;
   a digital notepad;
   a memory of 8 GB-128 GB of storage capacity;
   an electronic digital encyclopedia;
   an internet connection capability;
   a personal digital assistant (PDA) system;
   a WIFI calling connection capability;
   a WIFI internet connection capability;
   a mobile hotspot functionality;
   a digital dictionary;
   a digital clock;
   a Global Positioning System (GPS);
   a digital calculator;
   an AM/FM/Satellite/Internet radio;
   a satellite radio configured to be operable to emit and receive short-wavelength radio transmissions and create a local network in proximity to said ear worn communication device;
   a speech to text processor operable for transcribing spoken conversations for display to a screen of a communication device;
   the touch screen operable for controlling said ear worn communication device;
   a vibrator function for receiving calls;
   a voice ID banking system;
   a credit card bill payment system;
   a wireless point of sale payment system;
   a language translation module operatively connected to said microphone, wherein said language translation module is configured to be operable to translate textual communications to and from at least some languages;
   a car remote control module, which is configured to be operable for remotely controlling at least some operations of a car;
   an answering machine;
   a motion sensor configured to be operable to detect motion near said ear worn communication device;
   a computer remote control module, which is configured to be operable for remotely controlling at least some operations of another communication device;
   a voice recognition module operatively connected to said microphone, which is configured to be operable to turn said ear worn communication device off and on; and
   a vital signs measurement module, which is operatively connected with measurement sensors and signal processing algorithms operable to monitor at least one of a heart rate, pulse and body temperature.

2. The ear worn communication device of claim 1, in which said communication device voice ID banking system comprises an audible voice recognition banking ID system operatively connected to said microphone, which is operable to enable the user to do personal banking and making wire money transfers.

3. The ear worn communication device of claim 1, further comprising a solar powered battery that holds a charge and the capability to be charged by your a person's body heat.

4. A system comprising:
an ear worn communication device, said ear worn communication device comprising an ear piece, said ear piece being configured to be operable to at least partially engage with an ear, wherein said ear piece comprises a hook shape configured to at least partially wrap around the ear, said ear worn communication device being configured to be operable to initiate a communication in response to an audible command, said ear worn communication device being further configured with a speak recognition function to be operable to perform at least one function with an audible command, said ear worn communication device being further configured to exchange data with an external processor, said ear worn communication device further being configured as a remote control that is operable to control at least some of the features or functions listed below, said ear worn communication device being further configured to comprise:
a communication processor configured to initiate said communication in response to said audible command;
a microphone operatively connected with said communication processor, said microphone is configured to receive said audible command;
a task module, said task module receives said audible command from said microphone to perform a voice activated operation;
a network module, said network module is configured to receive a task operation from said task module, wherein said network module is further configured to send said task operation to at least one of an external computer for execution;
in which said microphone comprises an array of microphones that is configured to determine the directionality of said audible command, and wherein said array of microphones is further configured to differentiate multiple audible commands by position;
a speaker configured to transmit communications received form an external communication device, in which said speaker comprising an adjustable volume configured to be operable with said audible command;
a power port configured to receive a power cord for connecting to an external power source;
a data port configured to receive a data cord for exchanging data with the external processor, said data port comprising at least a fiber optic data port and said data cord comprising at least fiber optic cable;
a database of contacts;
a display configured to display said contacts from said database of contacts, said display comprising at least a touch screen configured to allow for initiating and receiving of communications from said contacts and to control communication device functions;
a Bluetooth speaker connection;
a digital book;
a digital notepad;
a memory of 8 GB-128 GB of storage capacity;
a digital encyclopedia;
an internet connection capability;
a personal digital assistant (PDA) system;
WIFI calling connection capability;
WIFI internet connection capability;
a mobile hotspot functionality;
a digital dictionary;
a digital clock;
a Global Positioning System (GPS);
a digital calculator;
an AM/FM/Satellite/Internet radio;
a satellite radio configured to be operable to emit and receive short wavelength radio transmissions and create a local network in proximity to said ear worn communication device;
a speech to text processor operable for transcribing spoken conversations for display to a screen of a communication device;
the touch screen operable for controlling said ear worn communication device;
a vibrator function for receiving calls;
a voice ID banking system;
a credit card bill payment system;
a wireless point of sale payment system;
a language translation module operatively connected to said microphone, wherein said language translation module is configured to be operable to translate textual communications to and from at least some languages;
a car remote control module, which is configured to be operable for remotely controlling at least some operations of a car;
an answering machine;
a motion sensor operable to detect motion near said ear worn communication device;
a computer remote control module, which is configured to be operable for remotely controlling at least some operations of another communication device;
a voice recognition module, which is configured to be operable to turn said ear worn communication device off and on; and
a vital signs measurement module, which is configured with conventional sensors and signal processing algorithms operable to monitor a user's heart rate and/or body temperature and pulse.

* * * * *